May 25, 1965
P. GITZINGER ETAL
3,185,749
PROCESS AND APPARATUS FOR CENTERING AND ANCHORING
A SMALLER-DIAMETER ARTICLE IN
A LARGER-DIAMETER BORE
Filed May 2, 1961
11 Sheets-Sheet 1
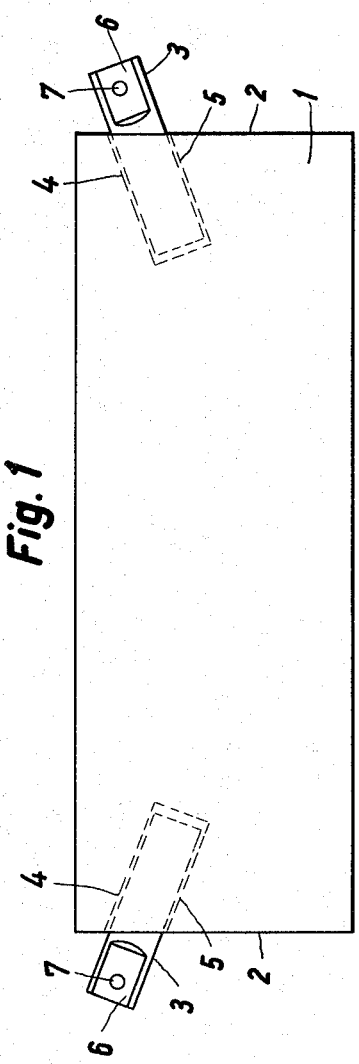
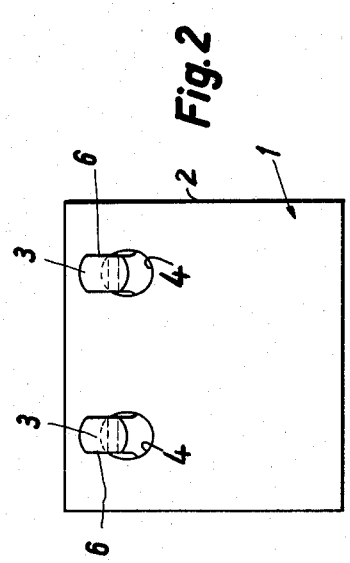
Inventors:
PETER GITZINGER
FRANZ BAYER
RUDOLF KOPPATZ
BY Michael S. Striker
ATTORNEY

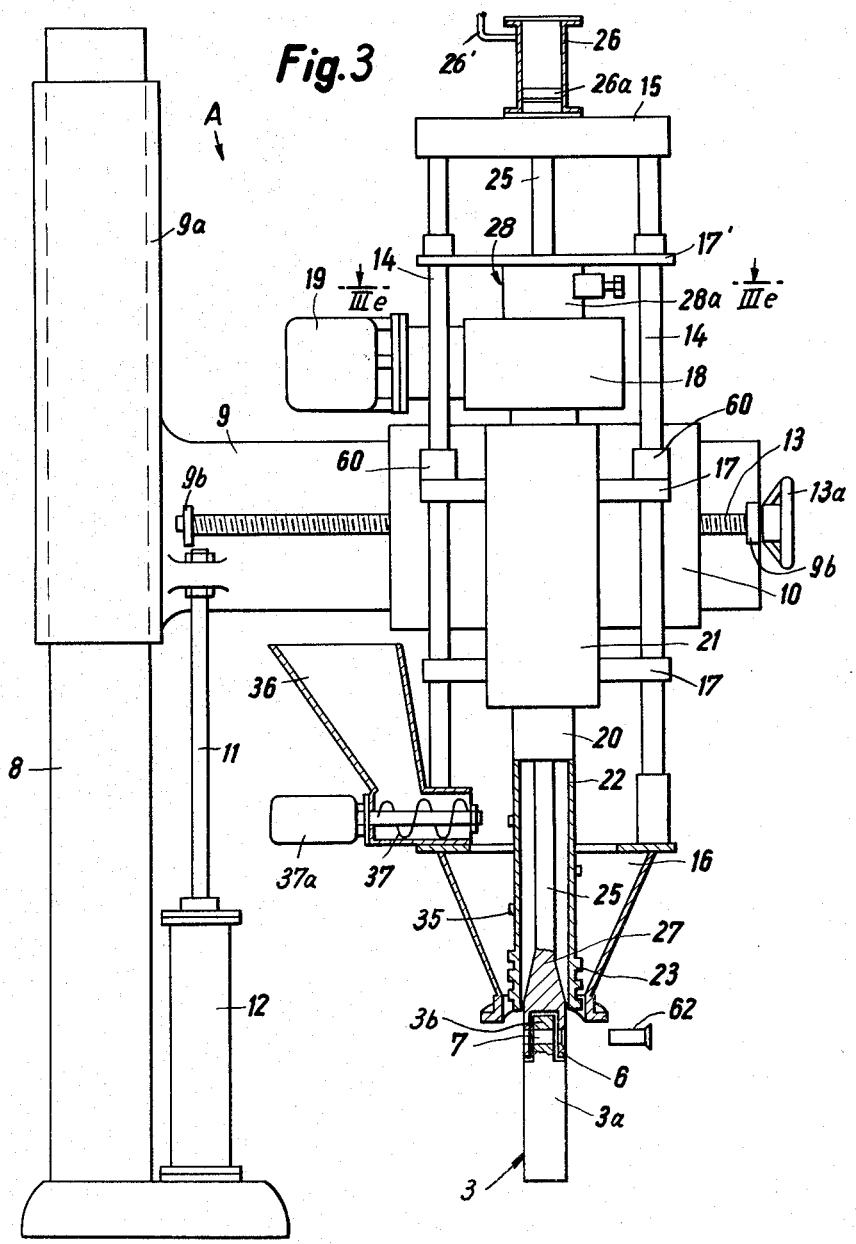

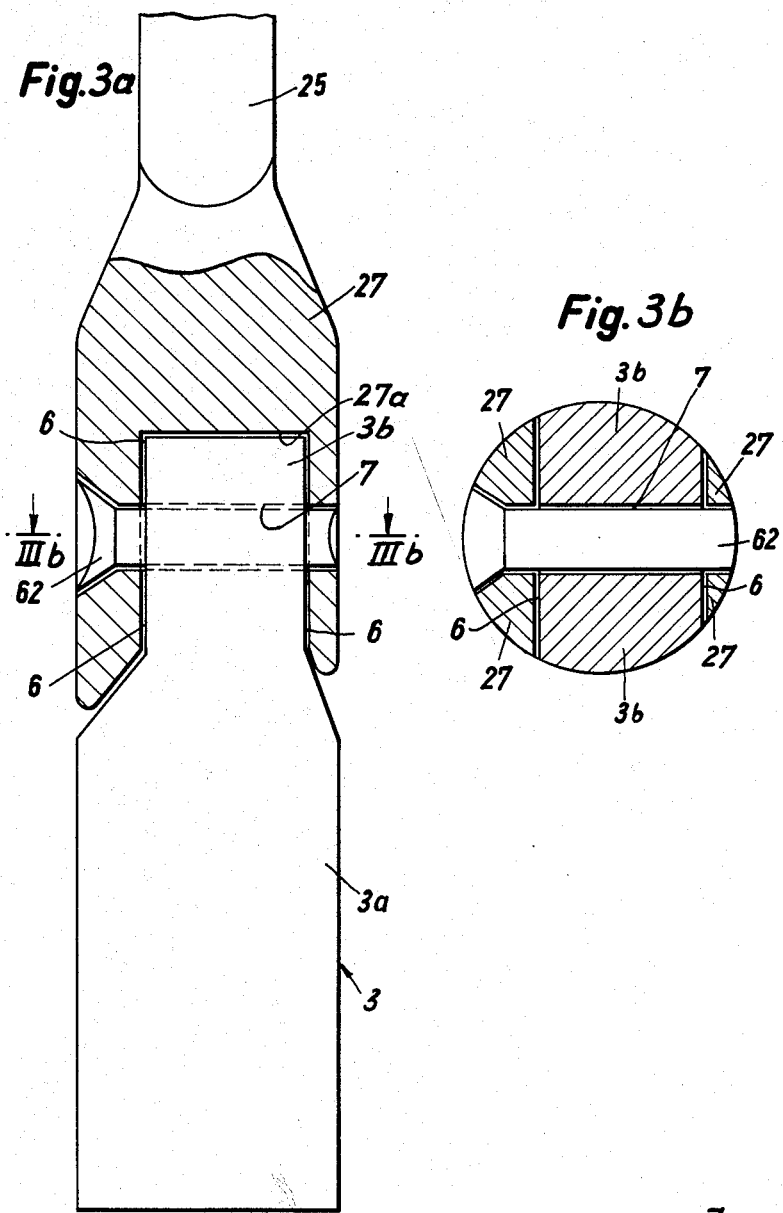

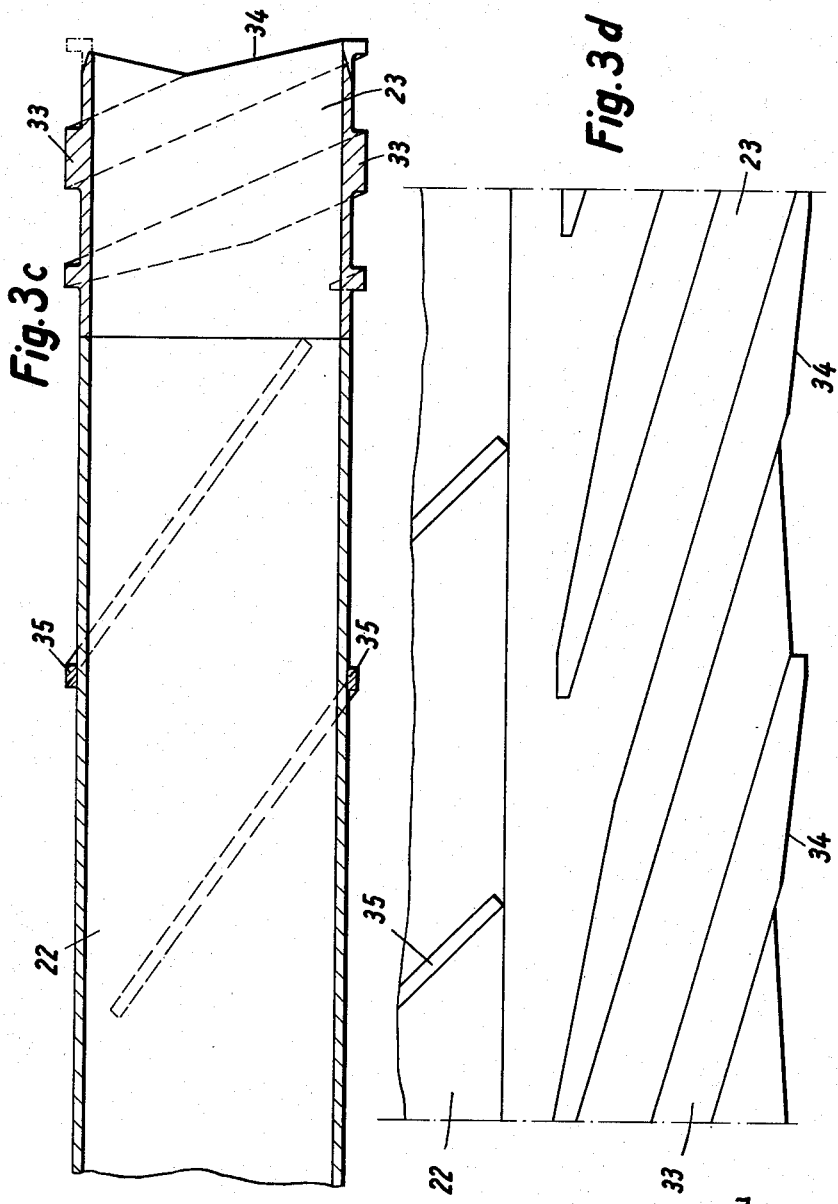

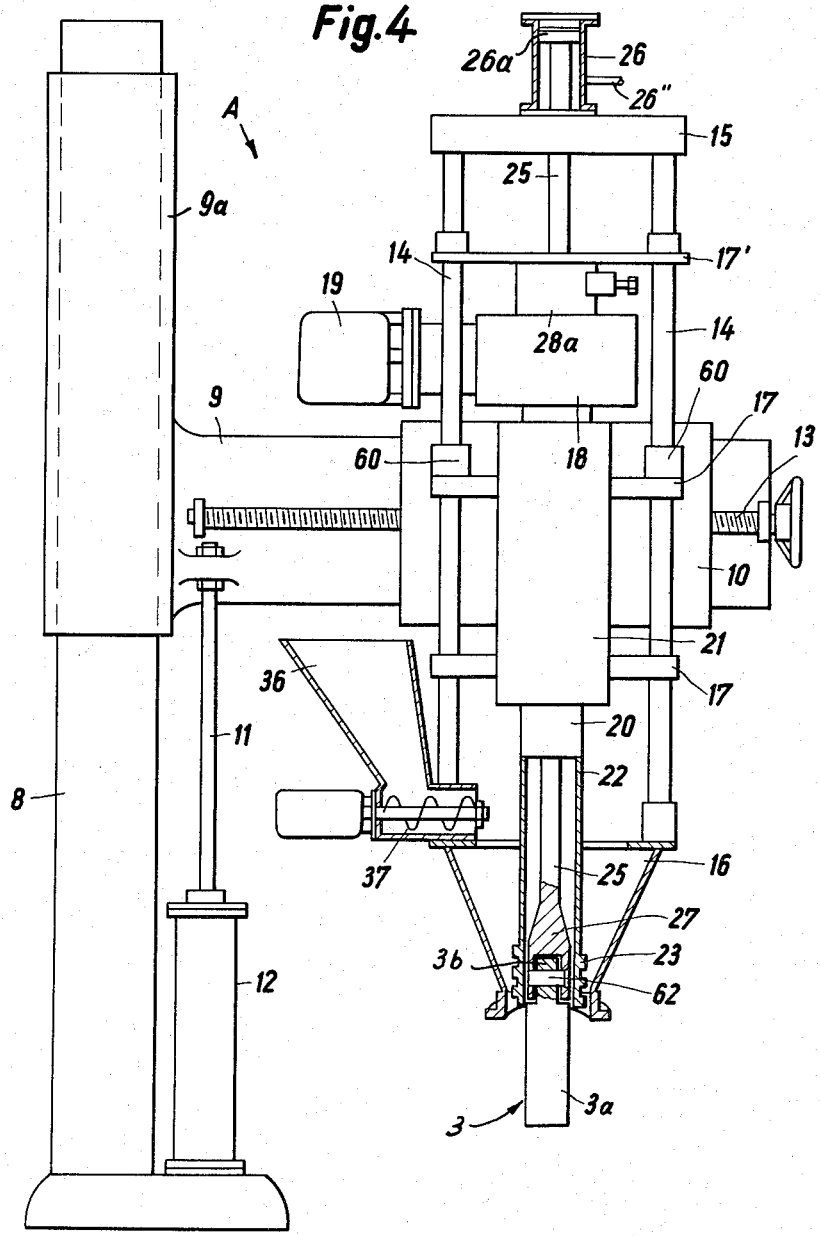

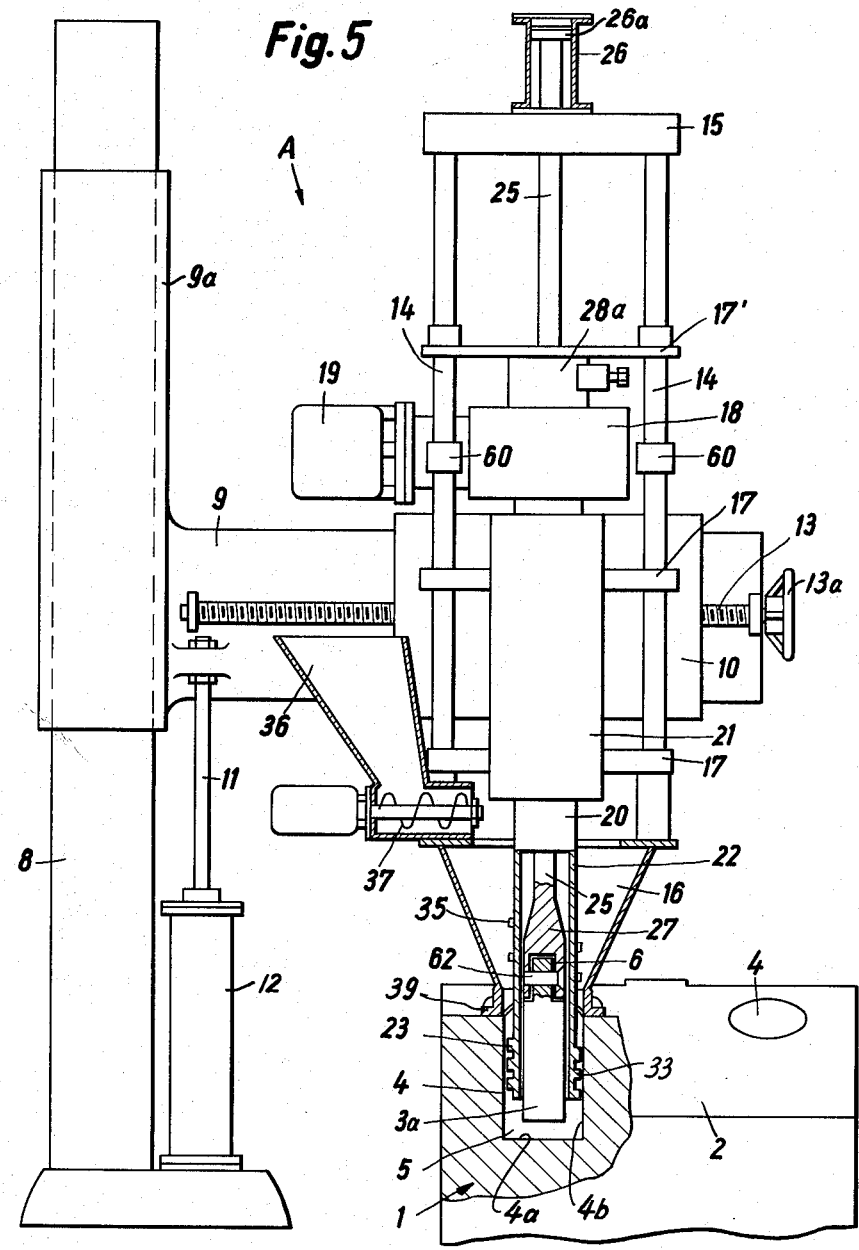

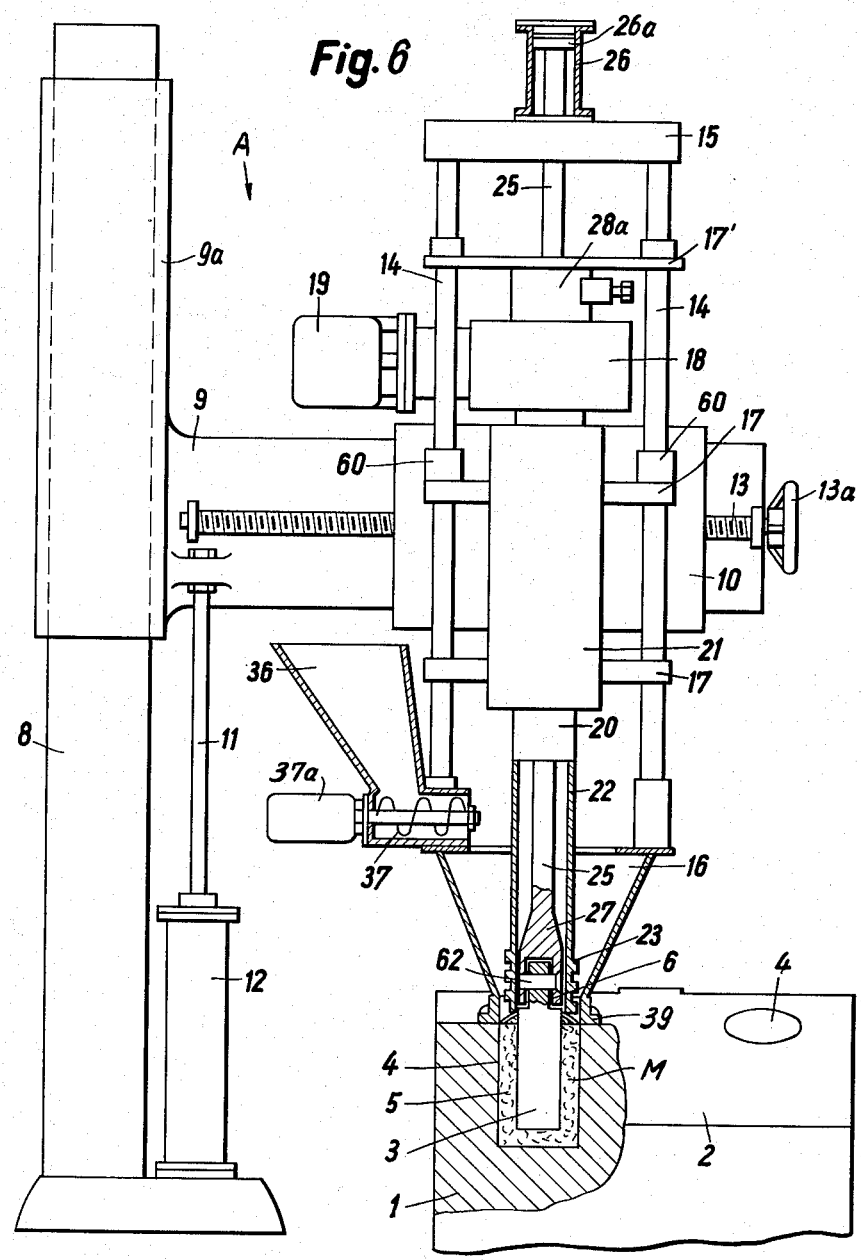

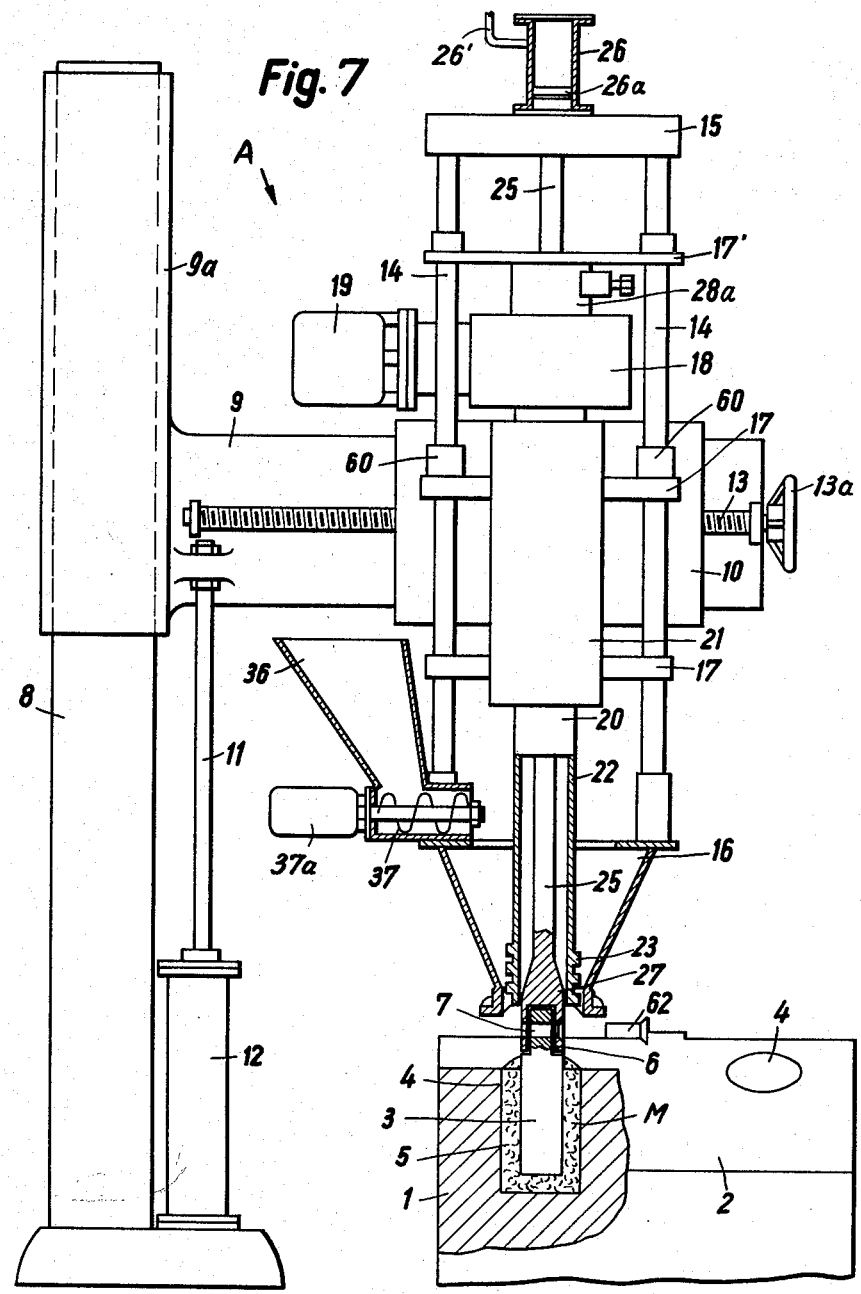

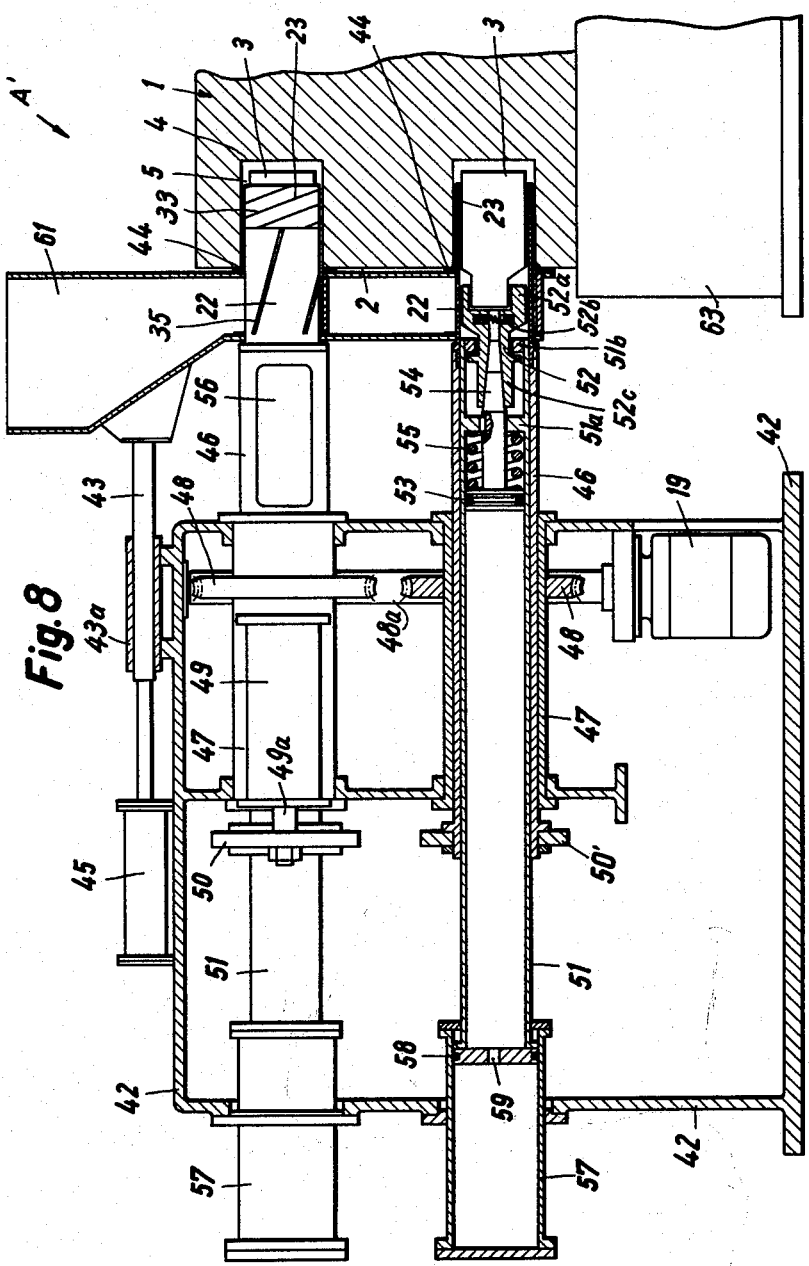

3,185,749
PROCESS AND APPARATUS FOR CENTERING AND ANCHORING A SMALLER-DIAMETER ARTICLE IN A LARGER-DIAMETER BORE
Peter Gitzinger, Franz Bayer, and Rudolf Koppatz, Grevenbroich, Lower Rhine, Germany, assignors to Vereinigte Aluminium-Werke Aktiengesellschaft, Bonn, Germany
Filed May 2, 1961, Ser. No. 107,136
Claims priority, application Germany, May 7, 1960,
U 18,573
12 Claims. (Cl. 264—262)

The present invention relates to a process and to an apparatus for centering a smaller-diameter article or insert in a larger-diameter bore, and more particularly to a process and apparatus for the centering and anchoring of nipples in the blind bores of carbon anodes of the type utilized in the production of aluminum in an electrolytic cell.

In the manufacture of aluminum by the electrolytic process, prebaked blocks of artificial carbon are utilized as anodes. The blocks are provided with laterally extending metallic bolts or inserts, called nipples or studs, which are recessed in blind bores formed in the blocks and are anchored in their respective bores by a current conducting mass or cement. The nipples project from their blocks and serve as a means for suspending the anodes on their supports as well as for conveying electric current to the anodes.

Heretofore, the nipples were anchored and centered in their bores by stamping the mass into that portion of each bore which surrounds the respective nipple. In order to reduce the resistance to the flow of electric current from the nipple to the carbon block, the difference between the radius of a bore and the radius of the nipple preferably should not exceed 10 mm., i.e. the thickness of the annular layer of current conducting mass is usually in the range of 10 mm. Consequently, the introduction and stamping of the mass into the bores of a carbon block in order to properly center and to simultaneously anchor the nipples is a time-consuming operation which must be carried out by expert workmen since the connection between the nipples and the block must be of high mechanical strength and must be a good conductor of electric current. Known methods and apparatus for the anchoring and centering of nipples do not fully satisfy such requirements because a connection established by stamping the current conducting mass about the nipples is seldom, if ever, of uniform quality.

Accordingly, it is an important object of the present invention to provide a novel process for the anchoring and centering of nipples and like articles in larger-diameter bores of anode blocks and the like, according to which the connections between the nipples and their blocks are of uniform quality and according to which the nipples are accurately centered in and are uniformly recessed in their respective bores.

Another object of the invention is to provide a process of the just outlined characteristics according to which the centering and anchoring of nipples may be carried out in rapid succession without affecting the quality of the connections between the nipples and the respective anode blocks.

A further object of the invention is to provide an apparatus for the practice of the above outlined process which is of very simple construction, which can be conveniently moved to any desired position with respect to the object whose bore or bores are about to receive a nipple or a like article, which may be utilized for simultaneously anchoring two or more articles in a carbon anode or a like object, which can be conveniently manipulated by a single operator, and which insures that the articles are properly centered and that the plastic mass utilized for anchoring the articles in their respective bores is uniformly distributed about the articles and is introduced into the bores at a constant pressure such as will insure that the bonds between the walls of the bores and the articles are of uniform quality.

With the above objects in view, the invention resides in the provision of a process for anchoring a smaller-diameter article, such as a metallic nipple, in a larger-diameter blind bore formed, for example, in a carbon anode for use in the production of aluminum in an electrolytic cell, the process comprising the steps of inserting the article into the bore so that the article and the cylindrical wall of the bore define between themselves an annular space, and extruding a plastic mass into the annular space until the mass completely fills the space and thereby anchors the article in the bore. The article is preferably centered in the bore so that its axis coincides with the bore axis, and that end of the article which is inserted into the bore is preferably spaced from the bottom wall of the bore. The plastic mass is preferably introduced by means of an externally threaded annular extruding member in the form of a worm which is received with small tolerance in the cylindrical wall of the bore and whose thread or threads form a helical passage with the cylindrical wall. The worm is rotated while the article is held against rotation, and the plastic mass is introduced into the helical passage to be engaged by the worm and to be extruded into the annular space whereby the mass progressively filling the annular space gradually expels the worm toward and through the open end of the bore. In order to insure that the mass will completely and uniformly fill the annular space between the article and the cylindrical wall of the bore, the worm may be subjected to a preferably adjustable pressure which tends to move it toward the bottom wall of the bore so that the mass progressively filling the annular space must overcome this pressure when it gradually expels the worm toward the open end of the bore.

In devising an apparatus for the practice of the above process, it was necessary to solve a series of problems such as providing simple and reliable means for properly centering the articles in their respective bores during the extruding steps, providing means for insuring that the articles assume a predetermined angular position with respect to the object in whose bores they are anchored by a plastic mass, and providing means for insuring that the plastic mass is being extruded at a uniform pressure so that the bond between the walls of the bore and the periphery of an article inserted therein is of uniform quality in all zones of the extruded plastic mass.

The improved apparatus comprises one or more extruding presses each of which includes a specially constructed externally threaded worm of such dimensions that it may snugly but rotatably surround the nipple in a bore and that it may be received with small tolerance in the cylindrical wall of the bore, means for feeding a plastic mass to the helical passage defined by the threads of the worm with the cylindrical wall of the bore means for rotating the worm so that the threads of the worm extrude the plastic mass into the annular space between the periphery of an article and the cylindrical wall of the bore, and means for non-rotatably supporting and for axially reciprocating the article with respect to the worm.

The extruding press or presses may be maintained in horizontal or vertical position, depending on the construction of means which holds the carbon anode during the extruding step. If the press or presses are vertical, the plastic mass may be fed to the respective worms by gravity though it is preferred to provide the presses with means for positively advancing the plastic mass to the threads of the respective worms. Such positively advancing means preferably assumes the form of a feed cylinder whose outer diameter is smaller than the diameter of a cylindrical bore wall and which is formed with external convolutions adapted to entrain the mass from a hopper or a like source which latter surrounds the feed cylinder and is preferably movable with respect to the feed cylinder toward and away from that end face of the anode block in which the bores are formed.

Certain other features of the invention reside in the provision of means including a main supporting structure for reciprocating the entire extrusion press or presses in horizontal and/or vertical direction, in the provision of specially constructed gripper means for holding the nipples during the extruding step, and in the provision of means for adjusting the pressure at which the plastic mass is extruded into a bore so as to control the strength of the bond between a nipple and the surrounding walls of its bore.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a side elevational view of a carbon anode block with the nipples inserted into and centered in their respective blind bores;

FIG. 2 is an end elevational view of the anode block as seen from the right- or left-hand side of FIG. 1;

FIG. 3 is a partly elevational and partly sectional view of an apparatus comprising a single press for extruding a plastic mass into the bores of the anode block, this apparatus embodying one form of our invention and its parts being shown in a position they assume while a nipple is about to be connected to its supporting member;

FIG. 3a is a greatly enlarged fragmentary partly sectional detail view of the nipple supporting member, showing a nipple connected to the forked end portion of its supporting member preparatory to insertion into a blind bore;

FIG. 3b is a transverse section as seen in the direction of arrows from the line IIIb—IIIb of FIG. 3a;

FIG. 3c is a greatly enlarged fragmentary axial section through the extruding and compacting worm and through a portion of the feed cylinder which supports the worm;

FIG. 3d is a developed view of the structure shown in FIG. 3c;

FIG. 4 illustrates the apparatus in the view of FIG. 3 but with the nipple in partly retracted position just prior to insertion of the nipple into a blind bore;

FIG. 5 shows the apparatus in a position its parts assume when the nipple is inserted into the bore and prior to introduction of the plastic mass;

FIG. 6 shows the apparatus in a position its parts assume when the extrusion of plastic mass is completed;

FIG. 7 illustrates the apparatus in a position preparatory to separation of an anchored nipple from its supporting member; and FIG. 8 is a partly elevational and partly vertical sectional view of a modified apparatus which is utilized for simultaneously introducing, centering and anchoring a plurality of nipples into the blind bores of a carbon anode block.

Figure 3E:
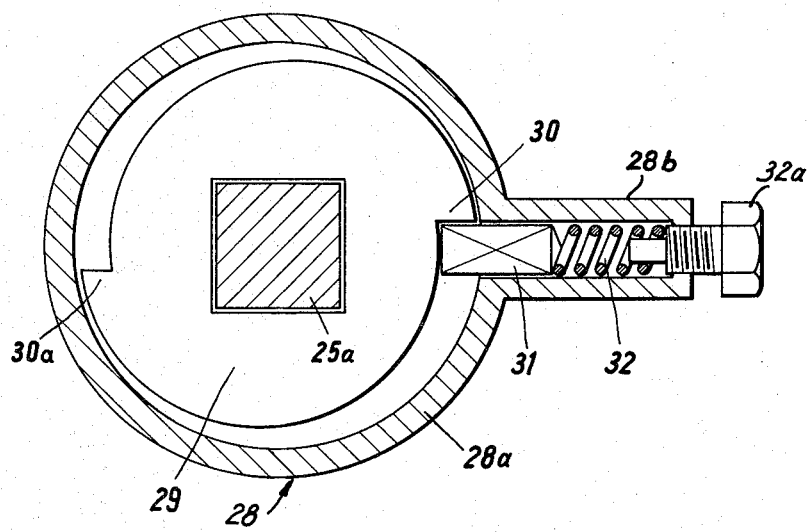
FIG. 3e is a greatly enlarged transverse section as seen in the direction of arrows from the line IIIe—IIIe of FIG. 3, showing the arrangement which prevents the nipple from rotating with the feed cylinder.

Referring now in greater detail to the drawings, and first to FIGS. 1 and 2, there is shown an electrode in the form of a carbon anode block 1 preferably assuming the shape of a parallelepiped whose spaced parallel shorter end faces 2 are provided with pairs of inclined blind bores 4, each bore receiving a nipple 3 in such a way that an annular space 5 is formed between the cylindrical wall of the bore and the periphery of each nipple, and that the innermost end of each nipple is somewhat spaced from the bottom wall of the respective bore. The angle enclosed by the axis of each bore 4 with the planes of the vertical end faces 2 is usually between 10–30 degrees. The annular spaces 5 are filled with a current conducting plastic mass in a manner to be described in connection with FIGS. 3, 4, 5, 6, 6a, 7 and 8. Each nipple 3 comprises a cylindrical inner portion 3a (see FIG. 3a) which is received in the respective bore 4 and a second or outer portion 3b which projects from the block 1 and which is formed with two flat parallel side faces 6 as well as with a transversely extending aperture 7. The side faces 6, the aperture 7 and headed bolts 62 serve as a means for non-rotatably securing the nipples to supporting members or rods 25, shown in FIGS. 3, 3a, 3b and 4–7, which are usually connected with a bus bar to conduct electric current to the block 1. The side faces 6 of the nipples 3 are usually located in planes which are parallel with the lateral edges of the respective end faces 2.

Figure 6A:
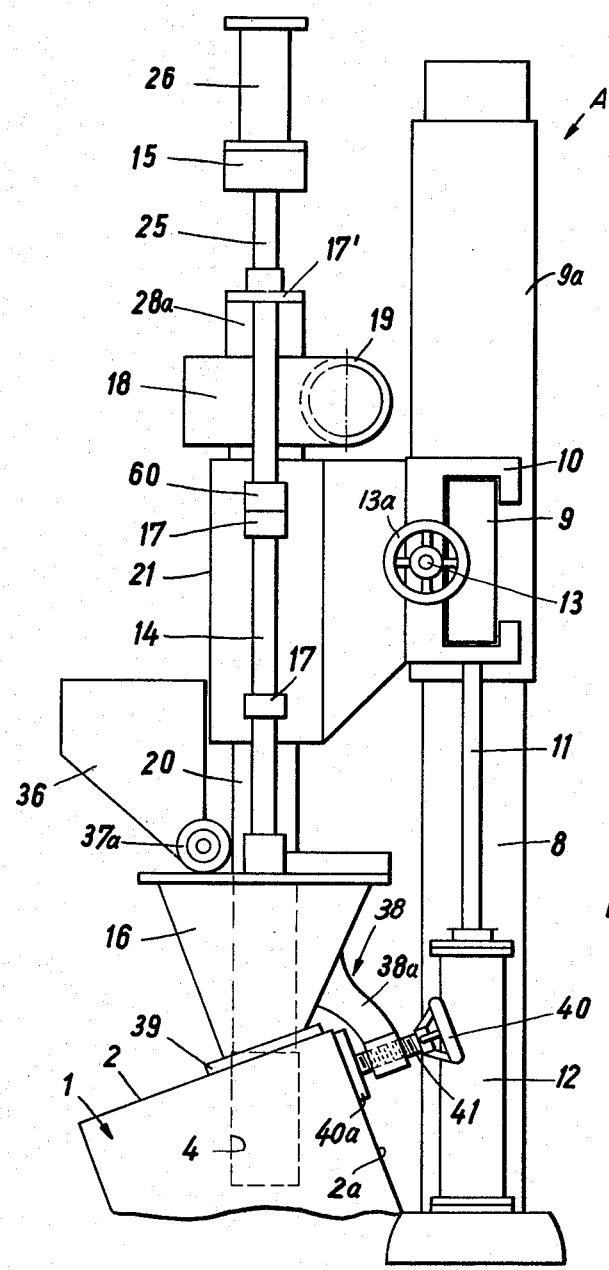
FIG. 6a is a side elevational view of the structure shown in FIG. 6.

FIG. 3 shows one form of the extruding or bore filling apparatus A which is utilized for introducing a plastic mass into the annular spaces 5 between the nipples 3 and the cylindrical walls of the respective blind bores 4. This apparatus comprises a main supporting means in the form of a column or pillar 8 which supports a vertically slidable substantially horizontal arm 9 constituting a rail or guideway for a horizontally reciprocable carriage 10. The manner in which the carriage 10 is supported on the arm 9 is best shown in FIG. 6a. The means for reciprocating the cylindrical sleeve 9a of the arm 9 along the pillar 8 comprises a fluid operated motor preferably in the form of a double-acting hydraulic or pneumatic cylinder and piston assembly 12 whose push rod 11 is connected with the arm 9 in the manner shown in FIG. 3. The carriage 10 is reciprocable along the arm 9 by means of a spindle 13 whose threads mesh with internal threads of a horizontal bore formed in the carriage and whose ends are rotatably mounted in a pair of spaced bearing brackets 9b provided on the arm 9. The brackets 9b hold the spindle 13 against axial movements with respect to the arm 9 and, when the spindle is rotated by its hand wheel 13a, the carriage 10 will move toward or away from the pillar 8, depending on the direction in which the spindle is rotated. Owing to the vertical adjustability of the carriage and of the arm 9 along the pillar 8, and owing to the horizontal adjustability of the carriage along the arm 9, the actual extruding press which is supported by the carriage 10 may be moved to any desired position with respect to the carbon anode block 1 which is shown in FIGS. 5, 6, 6a and 7. The extruding press comprises a hollow vertical drive shaft 20 which is rotatable in a vertical bearing sleeve 21 secured to or integral with the carriage 10, a thin-walled feed cylinder 22 which is coaxial with and is either connected to or integral with the lower end of the drive shaft 20, an externally threaded annular extruding member in the form of a worm 23 at the lower or forward end of the feed cylinder 22, a reducing gearing 18 which is mounted on the carriage 10 and which is drivingly connected with the shaft 20, and a preferably electric motor 19 which drives the reducing gearing 18. The carriage 10 further supports two spaced horizontal guide bars 17 which cooperate with a third guide bar 17' mounted on the housing 28a of an arrangement 28 which prevents the nipple-supporting member 25 from revolving with the drive shaft 20 and with the feed cylinder 22. The arrangement 28 is mounted on the reducing gearing 18. The bars 17 and the bar 17' guide two spaced parallel uprights 14 whose lower ends support a source of plastic mass here shown as an upwardly diverging conical hopper 16. The uprights 14 constitute a means for vertically reciprocably supporting the hopper 16. As shown, the upper ends of the uprights 14 are connected with each other by a crosshead 15 which carries a fluid operated motor in the form of a preferably pneumatic cylinder and piston assembly 26, 26a whose piston 26a is connected with the upper end of the nipple-supporting member 25 so that the uprights 14, the crosshead 15, the hopper 16 and the fluid motor 26, 26a may move in unison with respect to the drive shaft 20. In addition, the supporting member 25 is axially reciprocable by the piston 26a independently of the hopper 16 and with respect to the feed cylinder 22 so as to extend its forked lower end portion 27 (best shown in FIG. 3a) downwardly and beyond the worm 23. The lower end portion 27 of the supporting member 25 constitutes a gripper or tongs and is formed with an eccentric recess 27a to receive the flattened or faceted portion 3b of a nipple 3, i.e. to receive that portion of a nipple which is bounded by the side faces 6. When the extrusion press is about to be put to actual use, the gripper 27 first assumes the position of FIG. 3 by being expelled from the screw 23 so that it may be connected with a nipple.

The arrangement 28 for holding the nipple supporting member 25 against rotation with the drive shaft 20 is shown in FIG. 3e. It comprises a ratchet 29 which is non-rotatably secured to a non-circular portion 25a of the supporting member 25 and is formed with two radial tooth-shaped projections 30, 30a which are spaced through 180 degrees with respect to each other. The ratchet 29 is accommodated in the housing 28a which is formed with a hollow radial extension 28b for a pawl in the form of an axially reciprocable bolt or stud 31 which is biased by a resilient element in the form of a helical spring 32. The bias of the spring 32 may be adjusted by a headed bolt 32a which is screwed into the outer end of the tubular extension 28b. The ratchet 29 may be turned in a first angular direction, i.e. anticlockwise as viewed in FIG. 3e, but the pawl 31 prevents it from turning in the opposite angular direction, i.e. in the clockwise direction in which the motor 19 drives the shaft 20. When the ratchet 29 is turned anticlockwise through 180 degrees with respect to the position of FIG. 3e so that the pawl 31 engages with the tooth 30a, the apparatus A may be used for filling plastic material into the other bore 4 provided in the same end face 2 of the carbon anode block 1. As best shown in FIGS. 3a and 3b, the side faces 6 of the adjacent nipples 3 are arranged in mirror symmetry and one of the side faces is closer to the axis of the nipple than the other side face; therefore, the supporting member 25 must be turned through 180 degrees when the appartus assumes the position necessary for the filling of the right-hand bore 4, as viewed in FIG. 2, provided the filling of the left-hand bore is already completed.

FIGS. 3c and 3d illustrate the feed cylinder 22 and its annular worm 23. It will be noted that the worm 23 is formed with a small number (e.g. one or two) of comparatively flat (low pitch) external threads 33, these threads terminating at the specially configured end face 34 of the worm. The end face 34 is located in a plane which is inclined with respect to a plane perpendicular to the axis of the worm 23, and the end face 34 consists of mutually inclined sections; this has been found to improve the filling or extruding action of the press. The exterior of the feed cylinder 22 is provided with comparatively steep convolutions 35 whose pitch is greater than the pitch of the threads 33 and which deliver plastic mass to the helical passage formed between the threads 33. The internal diameter of the worm 23 exceeds only slightly the diameter of a nipple 3 so that the latter is received in the worm with a minimal tolerance. The axial length of the worm 23 preferably at least approximates the outer diameter of the thread or threads 33.

When the worm 23 is introduced into a bore 4, its threads 33 fit accurately into the cylindrical wall of the bore. On the other hand, the outer diameter of the feed cylinder 22 is less than the diameter of a bore 4, i.e. there is an annular gap between the thin-walled cylinder and the cylindrical wall of the bore 4 so that the plastic mass may pass from the hopper 16 through this gap and into the bore to fill the annular space 5 between the cylindrical bore wall and the periphery of a nipple portion 3a. In such position of the feed cylinder 22, the latter's convolutions 35 positively advance the plastic mass into the annular space 5.

The hopper 16 receives plastic mass from a screw conveyor 37 which is driven by a motor 37a and which is disposed at the lower end of a feed pipe 36 constituting the original source of plastic material. The provision of the conveyor 37 is considered necessary owing to special composition of the current conducting plastic mass which is fully described in copending application Serial No. 780,770 of Werner Helling assigned to the same assignee. The conveyor 37 may be replaced by a suitable bucket wheel or the like as long as it can insure a controlled delivery of plastic mass to the hopper 16.

FIG. 6a shows a means 38 for preventing lateral displacements of the hopper 16 with respect to the face 2 when the apparatus A is in actual use. This means 38 comprises a bracket 38a which is secured to the hopper 16 and which is formed with a threaded bore meshing with a threaded spindle 41, the latter provided with a handwheel 40 at one of its ends and with an end plate 40a at its other end. The plate 40a abuts against the upper side or face 2a of the block 1 when an inclined sealing annulus 39 secured to the discharge end of the hopper 16 abuts against the end face 2 to prevent the escape of plastic mass during the actual filling or extruding operation. The faces 2, 2a are inclined with respect to each other and, in the embodiment of FIG. 6a, enclose an angle of 90 degrees. It will be noted that the sealing annulus 39 at the discharge end of the hopper 16 is located in a plane which is inclined with respect to a plane that is perpendicular to the axis of the feed cylinder 22. The axial movements of the hopper 16 are limited by suitable preferably adjustable stops 60 which are secured to the uprights 14 and which come into abutment with the upper side of the upper guide bar 17 when the hopper is permitted to descend by gravity to its lowermost position with respect to the worm 23 and feed cylinder 22.

The current conducting plastic mass is of a consistency similar to that of wet sand or wet soil. Once the apparatus A is adjusted to assume the position of FIG. 5 in which a nipple 3 mounted in the gripper 27 of the supporting member 25 extends into and is properly centered in a bore 4 in such a way that the nipple and the cylindrical wall of the bore define the aforementioned annular space 5 and that the lower end of the nipple is somewhat spaced from the bottom wall of the bore, the operator starts the motor 19 to rotate the drive shaft 20 and the feed cylinder 22 with the worm 23, whereby the convolutions 35 entrain and advance the plastic mass from the hopper 16 into the range of the threads 33. The worm 23 extends close to the forward end of the nipple and close to the bottom wall of the bore when the extruding operation begins. Of course, if the feed cylinder 22 is in a vertical position, as shown in FIGS. 3 and 4, the plastic mass may descend by gravity so that the convolutions 35 may be omitted.

In the first stage of the extruding operation, the worm 23 presses the plastic mass into the space between the bottom wall of the bore 4 and the lower end of the nipple 3. In the next stage, the mass begins to fill the annular space 5 whereby the mutually inclined sections of the end face 34 at the forward end of the worm 23 insure that the plastic mass is pressed into the space 5 with a considerable force to make sure that the space 5 is completely filled. As the space 5 is being progressively filled with the plastic mass, the worm 23 is forced upwardly toward the open end of the bore 4, and the upward movement of the worm is resisted by the weight of all parts which are vertically movably connected thereto.

Of course, it will be readily understood that the lifting force of the plastic mass in the annular space 5 may be resisted by a compressed fluid (FIG. 8) or by one or more springs which may be provided to bias the hopper 16 in a direction toward the anode block 1. The exact magnitude of the force with which the worm 23 should resist an outward movement toward the open end of the bore 4 depends on the desired compactness of the plastic mass in the annular space 5.

We will now describe the operation of the apparatus with reference to FIGS. 3, 4, 5, 6, 6a and 7. In FIG. 3, the apparatus is in a position it assumes during the suspension of a nipple 3 in the forked lower end portion or gripper 27 of the supporting member 25. The cylinder 26 receives a pressure fluid through the supply conduit 26' so as to move the piston 26a in downward direction and to expel the gripper 27 through and beyond the lower end of the worm 23 and beyond the discharge end and the sealing element 39 of the hopper 16 which latter is already in its lowermost position because the stops 60 abut against the upper side of the upper guide bar 17. The operator is now in a position to introduce the flattened nipple portion 3b into the recess 27a (see FIG. 3a) and to insert the bolt 62 through the transverse aperture 7 as well as through aligned apertures formed in the prongs or jaws of the gripper 27.

In the next step, the operator admits pressure fluid through the second supply conduit 26'' (see FIG. 4), and causes the piston 26a to lift the supporting member 25 so that the gripper 27 entrains the upper nipple portion 3b into the interior of the annular worm 23. The apparatus is now ready to be placed into operative position with respect to a carbon anode block 1 in a manner as shown in FIG. 5. It will be noted that the anode block 1 is tilted into such position that the axis of the left-hand bore 4 which is about to receive the nipple 3 is vertical so that the nipple 3 may be properly centered in the left-hand bore. The operator then manipulates the cylinder 12 to lift the lower end of the nipple 3 above the end face 2 of the block 1 and thereupon manipulates the handwheel 13a of the spindle 13 to move the nipple above the left-hand bore 4. In the next step, the operator again manipulates the cylinder 12 so as to cause the nipple 3 to enter the left-hand bore 4 until the suitably inclined lower end face of the annulus 39 comes into sealing abutment with the end face 2 whereby the cylindrical lower nipple portion 3a and the worm 23 extend into the left-hand bore 4, the lower end of the nipple portion 3a being spaced a requisite distance from the bottom wall 4a of the bore 4 and the threads 33 of the worm 23 defining a helical passage with the cylindrical wall 4b of the left-hand bore. The apparatus A is now in proper position to proceed with the extrusion of the plastic mass which begins when the operator starts the motor 19 to rotate the feed cylinder 22 and the worm 23 whereby the plastic mass contained in the hopper 16 is entrained by the convolutions 35 of the feed cylinder and is advanced into the range of the threads 33. These threads compel the mass to advance through the helical passage and into the lower part of the left-hand bore 4 to fill the space between the bottom wall 4a and the lower end of the nipple portion 3a and to thereupon progressively fill the annular space 5 upwardly and toward the open end of the left-hand bore. As the mass extruded by the threads 33 into the annular space 5 begins to fill the space beneath the worm 23, the latter is caused to move upwardly against the pressure exerted by its own weight, by the weight of the hopper 16, by the weight of the uprights 14, and by the weight of the crosshead 15 with the fluid motor 26, 26a. When the extruding step is completed, the parts of the apparatus assume the position of FIG. 6 in which the annulus 39 is still in sealing abutment with the end face 2 but the worm 23 is lifted by the extruded plastic mass M to a position just above the end face 2. In the final step, a pressure fluid is again admitted through the conduit 26' so that the cylinder 26 is lifted with respect to the piston 26a (see FIG. 7) to thereby entrain the hopper 16 in upward direction and to expose the gripper 27. The operator is now free to withdraw the connecting bolt 62 and thereupon manipulates the cylinder 12 so as to lift the extruding press of the apparatus A above the end face 2 while the properly anchored nipple 3 remains embedded in the plastic mass M.

If the operator then desires to anchor a second nipple in the right-hand bore 4 of the block 1 shown in FIG. 7, he operates the hand wheel 13a to align the gripper 27 with the right-hand bore, and thereupon turns the housing 28a in the anticlockwise direction, as viewed in FIG. 3e, so as to turn the supporting member 25 through 180 degrees and to reverse the position of the jaws on the gripper 27. The latter is now ready to properly support the second nipple. As indicated in FIG. 2, the nipples inserted in the bores formed in an end face 2 are arranged in mirror symmetry so that their side faces 6 which are more distant from the respective nipple axis face each other.

FIG. 8 illustrates a modified apparatus A' which is provided with two horizontal extruding presses adapted to simultaneously anchor two nipples 3 in the bores 4 formed in an end face 2 of the carbon anode block 1. The main supporting means of the modified apparatus A' comprises a frame 42 which carries a pair of hoppers 61 (only one shown) for feeding a current conducting plastic mass to the convolutions 35 of the respective feed cylinders 22. The discharge ends of the hoppers 61 are formed with preferably elastic sealing annuli 44 which are movable into sealing abutment with the end face 2 by means of one or more fluid operated motors each of which includes a double-acting cylinder 45 for a piston whose piston rod 43 is connected with the respective hopper 61 and is adapted to reciprocate the latter toward and away from the end face 2 of the anode block 1. The cylinder 45 is mounted atop the frame 42, and the piston rod 43 is guided by a bearing sleeve 43a which, too, is secured to or is integral with the frame.

The feed cylinders 22 are coaxially connected with hollow tubular drive shafts 46 which are respectively keyed or otherwise non-rotatably connected with drive cylinders 47. The cylinders 47 are rotatably mounted in but are held against axial movement with respect to the frame 42. The arrangement is such that the shafts 46 are axially movable in their respective drive cylinders 47. The cylinders 47 are driven by the motor 19 which is mounted in the frame 42 and which rotates a worm 48a, the latter meshing with a pair of worm wheels 48 each coaxially secured to one of the cylinders 47.

The means for axially reciprocating the upper feed cylinder 22 and its worm 23 comprises a crosshead 50 which is fixed to the rearmost end of the upper drive shaft 46 and which is connected with the piston rod 49a of a fluid operated motor 49 fixed to the frame 42. The crosshead 50 entrains the upper feed cylinder 22 and the latter's worm 23 from the upper blind bore 4 when the piston rod 49a is moved to the left, as viewed in FIG. 8. The lower feed cylinder 22 is adapted to be reciprocated and may be raised in a direction to move the lower worm 23 into the lower bore 4 by a similar fluid operated motor (only the crosshead 50' shown).

Each nipple supporting member assumes the form of an elongated hollow tube 51 which is telescoped into the respective drive shaft 46 and whose rear end portion projects beyond the respective crosshead 50, 50'. The supporting members 51 are held against angular movement with the drive shafts 46. At the forward end of each supporting member 51, there is provided a gripper 52 for a nipple 3, this gripper consisting of two halves and performing the function of the gripper 27 shown in FIG. 3a. The jaws 52a of each gripper are normally biased apart by a resilient element in the form of a spring 52b which tends to move the outwardly diverging inner faces of the rear gripper portions 52c toward each other and into abutment with the wedge-shaped forward end portion of an axially reciprocable plunger 54 which is non-rotatably guided in and is axially movable in a transverse partition 51a of the respective supporting member 51. The portions 52c are located in the respective tubular members 51. Each supporting member 51 is axially reciprocable by its own fluid operated motor 57, 58 whose double-acting cylinder 57 is mounted in the frame 42 and whose piston 58 is formed with one or more comparatively small axially parallel channels 59 through which a pressure fluid, e.g. compressed air, may enter from the rear portion of the cylinder 57 into the interior of the hollow supporting member 51. The plunger 54 carries at its rear end a piston 53 which is sealingly but axially reciprocably received in the interior of the supporting member 51 and which is biased by a resilient element 55 in a direction to withdraw its wedge shaped forward end portion from the rear portions 52c of the gripper 52 and to thereby permit the jaws 52a of the gripper to move apart and to release a nipple 3 under the bias of the spring 52b. The resilient element 55 may assume the form of a helical spring which is inserted between the rear side of the partition 51a and the front side of the piston 53. The bias of the spring 55 is opposed by compressed fluid introduced through the channel or channels 59 and, if the fluid pressure overcomes the bias of the spring 55, the wedge shaped forward end portion of the plunger 54 moves forwardly to spread the rear end portions 52c of the gripper 52 and to compel the jaws 52a to move toward each other and to firmly grip a nipple 3 therebetween. As shown, the two halves of the gripper 52 are tiltable in the through bore of a second partition 51b provided at the foremost end of the supporting member 51. The common pivot axis of the gripper halves is perpendicular to the axis of the member 51. It will be noted that the jaws 52a extend from the forward end of the respective member 51.

When a pressure fluid is admitted to the right-hand sides of the pistons 58, the supporting members 51 are shifted to the left, as viewed in FIG. 8, and move their respective grippers 52 into alignment with windows 56 formed in the drive cylinders 46 so that an operator may conveniently insert a new nipple upon completion of the preceding extruding operation. Of course, before the operator inserts a new nipple through the window 56, he permits some compressed fluid to escape from the bore of the supporting member 51 and through the channel or channels 59 so that the spring 52b may spread the jaws 52a to provide room for the faceted portion 3b of a new nipple. The arrangement 28 of FIG. 3e is not necessary in the apparatus A' of FIG. 8 because the jaws 52a of the two extruding presses may be permanently adjusted so as to properly hold two nipples in mirror symmetry with each other as shown in FIG. 2.

The operation of the apparatus A' will be readily understood. The anode carbon 1 is placed in requisite position on its holder or base plate 63 so that its end face 2 is turned toward the hoppers 61 and that the axes of the vertically spaced blind bores 4 coincide with the axes of the respective worms 23. It is assumed that the drive shafts 46 and the hoppers 61 are in retracted position, i.e. that they are moved to the left from the positions shown in FIG. 8. In the next step, the operator actuates the motors 49 in a sense to move the drive shafts 46 to the right and to thereby introduce the feed cylinders 22 and the worms 23 into the respective bores 4. Subsequently, the operator admits compressed fluid to the left-hand sides of the pistons 58 to properly clamp the nipples previously introduced through the windows 56 and to axially shift the supporting members 51 in a direction to the right whereby the nipples are inserted into their respective bores to the extent as shown in FIG. 8. The motors 45 press the sealing annuli 44 of the hoppers 61 against the end face 2 to prevent leakage of the plastic mass during the subsequent extruding step. The operator then starts the motor 19 to rotate the worms 23 and their feed cylinders 22 whereby the convolutions 35 feed the plastic mass from the hoppers 61 to the threads 33 and the extruding operation is carried out as described hereinabove in connection with the apparatus A. The bias exerted upon the drive shafts 46 and upon the worms 23 by their respective fluid motors 49 is preferably adjustable so that the worms 23 resist with a predetermined force the pressure of the plastic mass gradually filling the annular spaces 5. When the worms 23 are completely expelled from the respective bores, the operator arrests the motor 19 and withdraws the supporting members 51 by admitting compressed fluid to the right-hand sides of the pistons 58 and by simultaneously permitting the escape of compressed fluid through the channels 59 and from the left-hand sides of the pistons 58 so that the jaws 52a of the grippers 52 release the nipples and the nipples remain anchored in the plastic mass.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A process for anchoring a slightly smaller-diameter nipple in a larger-diameter blind bore formed in a carbon anode, comprising the steps of inserting the nipple into the bore to such an extent that one end of the nipple is slightly spaced from the bottom wall of the bore; centering the nipple in the bore so that its axis coincides with the axis of the bore and that an annular space of small radial dimension is formed between the periphery of the nipple and the cylindrical wall of the bore; holding the nipple against axial, angular and radial displacements with respects to the bore walls; and extruding a current-conducting plastic mass between the nipple and the walls of the bore so that the plastic mass first fills the space between the end of the nipple and the bottom wall of the bore, and that the mass thereupon progressively fills said annular space from the bottom wall to the open end of the bore to anchor the nipple in the anode.

2. An apparatus for extruding a current-conducting plastic mass into the annular space between the cylindrical wall of a larger-diameter blind bore provided in a carbon anode and the periphery of a smaller-diameter nipple which extends into the bore, comprising a hollow axially reciprocable rotary feed cylinder having a forward end adapted to be inserted into the annular space about the nipple and said cylinder having on its periphery feeding means arranged to deliver plastic mass into the bore of said carbon anode in response to rotation of said cylinder; an annular worm at the forward end of the cylinder, said worm having external threads and being receivable in the annular space ahead of said cylinder to surround the nipple whereby its threads define with the cylindrical wall of the bore a helical passage for the plastic mass; supporting means extendable into the worm for non-rotatably supporting the nipple in the bore so that the nipple is held against axial and radial movements with respect to the anode; a source of plastic mass at least partially surrounding the feed cylinder; and drive means for rotating the cylinder and the worm with respect to said supporting means so that the revolving cylinder entrains and advances the mass from the source to said passage and the worm compacts the mass in the annular space to anchor the nipple in the bore whereby the plastic mass which is fed into and compacted in the annular space gradually expels the worm from the bore.

3. An apparatus for simultaneously extruding a current-conducting plastic mass into annular spaces formed between the cylindrical walls of a plurality of axially parallel larger-diameter bores formed in and inclined with respect to the face of a carbon anode and the peripheries of smaller-diameter nipples which extend into the respective bores, said apparatus comprising, in combination, a frame; a plurality of extruding presses mounted in said frame, one for each bore, each extruding press comprising a rotary annular feed cylinder axially reciprocably mounted in said frame and having an end portion receivable in the respective annular space, said cylinder being provided on its periphery with feeding means arranged to deliver plastic mass into the respective bore in response to rotation of the cylinder, an externally threaded annular worm rigid with the end portion of the cylinder and extendable into respective annular space ahead of said cylinder, whereby its threads define with the cylindrical wall of the respective bore a helical passage for the plastic mass, axially reciprocable supporting means extending through the worm for non-rotatably supporting the nipple in the respective bore so that the nipple is held against axial and radial displacements with respect to the anode, a source of plastic mass comprising a hopper having a discharge end at least partially surrounding the feed cylinder and having a discharge end movable into sealing abutment with the face of the carbon anode, and drive means for rotating the cylinder and the worm with respect to said supporting means whereby the revolving cylinder entrains plastic mass from the hopper and advances the mass into said helical passage so that the revolving worm compacts the mass in the respective annular space and the mass progressively filling the anular space anchors the nipple in the anode and gradually expels the worm from the respective bore; and means for supporting said anode in a position where each of the bores will be aligned with the respective cylinder.

4. An apparatus as set forth in claim 3, wherein the means for rotating said feed cylinders comprises a plurality of tubular drive cylinders, one for each of said feed cylinders, said drive cylinders being rotatably mounted in the frame and being coaxial with the respective feed cylinders, a hollow drive shaft axially reciprocably received in each of and rotatable with the respective drive cylinder, said drive shafts being rigid with the respective feed cylinders, means for rotating the drive cylinders, and means for axially reciprocating said drive shafts with the respective feed cylinders, said reciprocating means comprising a crosshead connected with each drive shaft and a fluid operated motor mounted on said frame for reciprocating the crosshead.

5. An apparatus as set forth in claim 3, wherein each of said nipple supporting means comprises a hollow tubular member having a forward end and a gripper at said forward end, said gripper comprising two halves pivotable in said tubular member about an axis which is perpendicular to the axis of the tubular member and each of said halves having a nipple engaging jaw extending from said tubular member and a rear portion located in the tubular member, resilient means for biasing said jaws away from each other for releasing a nipple held between said jaws, and means comprising a fluid operated motor for moving said jaws toward each other so that the jaws may engage a nipple placed therebetween.

6. An apparatus as set forth in claim 5, wherein the means for moving the jaws toward each other further comprises a piston reciprocably received in said tubular member, a plunger connected with said piston and having a wedge shaped end portion extending between and engaging the rear portions of said halves, and resilient means for biasing said plunger away from said gripper and for permitting the first named resilient means to move the jaws away from each other.

7. An apparatus as set forth in claim 2, wherein said feeding means comprises convolutions whose pitch is greater than the pitch of threads on said worm and wherein the diameter of said worm approximates the axial length thereof.

8. An apparatus as set forth in claim 2 wherein said worm is provided with an end face consisting of sections which are inclined with reference to each other and to a plane perpendicular to the axis of said worm.

9. An apparatus as set forth in claim 2, wherein said drive means comprises a hollow drive shaft which is rigid with said cylinder and motor means for driving said shaft, said apparatus further comprising a frame including a carriage supportingly connected with said drive means and means for reciprocating said carriage in the axial direction of and at right angles to the axis of said cylinder so that said worm may be located in requisite position with reference to the anode.

10. An apparatus for extruding a plastic mass into a bore whose axis is inclined with reference to the respective face of the anode as set forth in claim 2, wherein said source comprises a magazine having a discharge end provided with an annular sealing member which abuts against the face of the anode and surrounds the bore to prevent escape of plastic mass when such mass is being fed into the annular space between the bore and the nipple.

11. An apparatus as set forth in claim 2, wherein said supporting means comprises a rod which extends through said cylinder and means for preventing rotation of said rod with said cylinder, said last mentioned means comprising a ratchet connected with the rod and having a pair of teeth angularly spaced from each other through 180 degrees, and a spring-biased pawl for engaging one of said teeth so as to prevent rotation of said rod in the direction of rotation of said cylinder.

12. An apparatus as set forth in claim 3, wherein said source of plastic material comprises hopper means having annular sealing means arranged to abut against the anode so as to surround the respective bore and to prevent escape of plastic mass, and means for reciprocating said hopper means with reference to the anode.

References Cited by the Examiner
UNITED STATES PATENTS

| | | | |
|---|---|---|---|
| 674,296 | 5/01 | Kielburg | 25—36 |
| 925,300 | 6/09 | Coleman | 18—5 |
| 1,546,155 | 7/25 | Wadsworth | 25—14 |
| 2,244,750 | 6/41 | Weisenburg | 25—36 |
| 2,504,313 | 4/50 | Fearon et al. | |
| 2,611,941 | 9/52 | Leitl | 25—14 |

ROBERT F. WHITE, *Primary Examiner.*

WILLIAM J. STEPHENSON, MORRIS LIEBMAN, ALEXANDER H. BRODMERKEL, *Examiners.*